United States Patent [19]

Giannakopoulos

[11] Patent Number: 5,144,914
[45] Date of Patent: Sep. 8, 1992

[54] DISPOSABLE KITTY LITTER BOX

[76] Inventor: Cidell M. Giannakopoulos, 19 Abbeywood Dr., Romeoville, Ill. 60441

[21] Appl. No.: 663,482

[22] Filed: Mar. 4, 1991

[51] Int. Cl.$^5$ ............................................. A01K 29/00
[52] U.S. Cl. .............................. 119/168; 229/117.24; 229/144
[58] Field of Search ................. 119/165, 168; 229/101, 229/117.24, 117.25, 144, 186

[56] References Cited

U.S. PATENT DOCUMENTS

| | | | |
|---|---|---|---|
| 1,021,874 | 4/1912 | Labombarde | 229/144 |
| 2,090,375 | 8/1937 | Rosenthal et al. | 229/144 |
| 2,536,530 | 1/1951 | Bergstein | 229/186 |
| 2,795,368 | 6/1957 | Caster et al. | 229/117.24 |
| 2,981,458 | 4/1961 | Thibault | 229/117.24 |
| 3,193,175 | 7/1965 | Moreton | 229/144 |
| 3,743,170 | 7/1973 | Riccio | 119/168 |
| 4,807,563 | 2/1989 | Berry et al. | 119/168 |
| 4,813,376 | 3/1989 | Kaufman et al. | 119/168 |
| 4,890,576 | 1/1990 | James | 119/168 |
| 5,007,530 | 4/1991 | Weismantel | 119/168 |

FOREIGN PATENT DOCUMENTS

| | | | |
|---|---|---|---|
| 953765 | 4/1964 | United Kingdom | 229/117.24 |
| 1023162 | 3/1966 | United Kingdom | 119/168 |

*Primary Examiner*—Gene Mancene
*Assistant Examiner*—Todd E. Manahan
*Attorney, Agent, or Firm*—Patula & Associates

[57] ABSTRACT

A kitty litter box is made of cardboard, plastic or other disposable material and can be folded outwardly to an open position for use as a tray to hold kitty litter or other absorbent material for use by cats, and folded inwardly to a closed box after being used and ready for disposal at which time both the box and its contents are discarded. The two opposite side walls of the box each include a diagonal slit at about the midsection of each side wall with a plurality of score lines or fold lines positioned in relation to each diagonal slit which enable a portion of the midsection of each side wall to flex and fold inwardly when the two outer portions are folded along a pair of spaced apart lateral score lines or fold lines in the bottom wall. The two outer portions are folded or pivoted in an arcuate path toward each other whereby one of the outer portions of the box is received within the opposite outer portion. The box is thus folded or pivoted from its open position to a closed position. When in the closed position the end walls of each outer portion are adjacent each other in "one outside of the other" relationship. A handle on the outer portion which is inside can be extended through a slot in the end wall of the portion which is on the outside thereby locking the folded box in the closed position with its contents securely held inside.

17 Claims, 3 Drawing Sheets

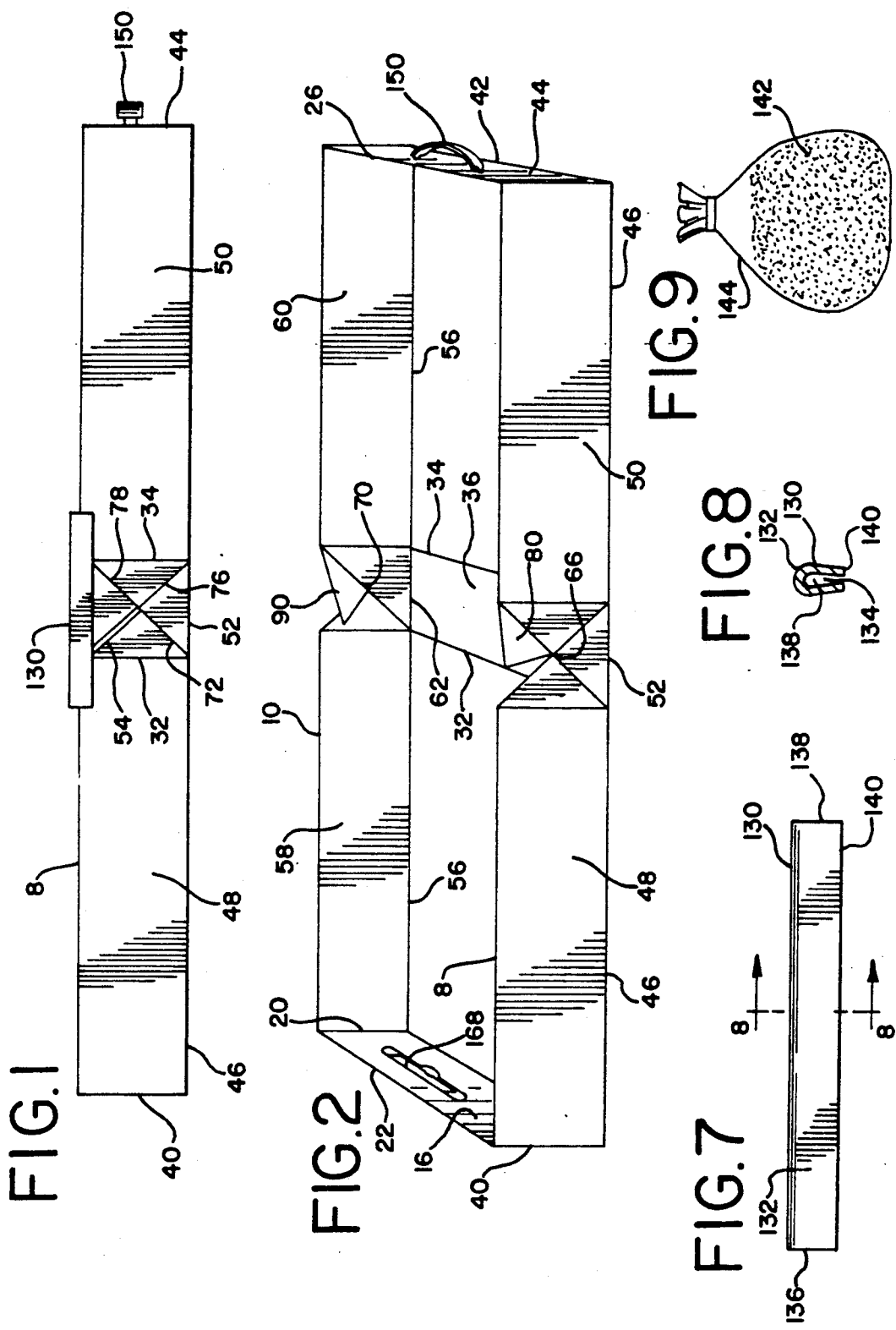

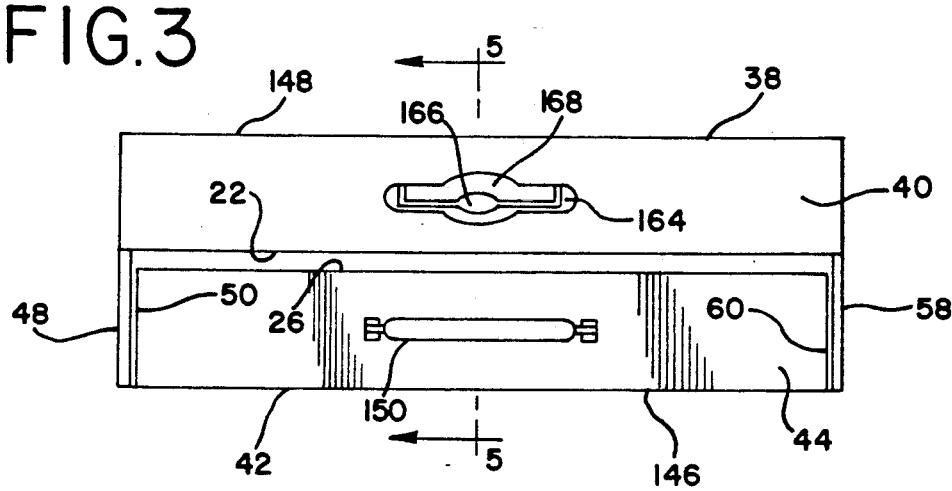
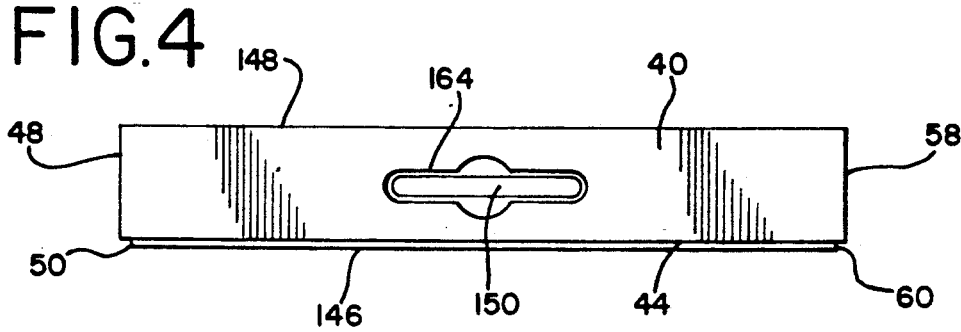
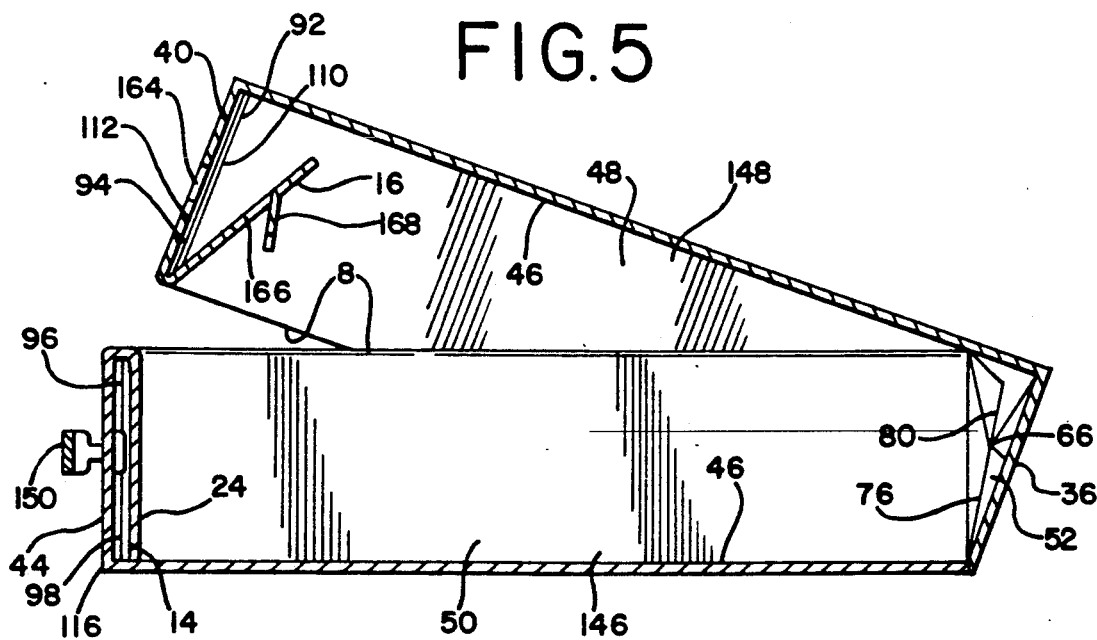

DISPOSABLE KITTY LITTER BOX

BACKGROUND OF THE INVENTION

This invention relates to the field of kitty litter boxes for cats or other house trained pets, which contain cat litter or other absorbent material for eventual disposal. In particular, this invention relates to those boxes for such use which are themselves made in a way that they are disposed of along with the material therein.

Prior art kitty litter type boxes known to the inventor include those disclosed in the following United States patents.

U.S. Pat. No. 4,884,526 issued to the present inventor discloses a disposable kitty litter box and bag combination, in which a disposable box is placed within a disposable bag folded along the outer sides of the box. The bag is unfolded when ready to dispose of the contents which completely encloses the box and kitty litter material within the disposable bag and the bag is then tied shut.

U.S. Pat. No. 4,646,685 discloses a unit which requires assembling a box out of a flat sheet of box-forming material. Even though when assembled the corners of the box overlap, it appears that cracks and openings will still exist through which liquids can seep. In the present invention, the box is made by the manufacturer with side walls having integrally joined corners, or otherwise made so as to eliminate openings and cracks through which liquids can seep. No assembly of the box is needed by the purchaser of the kitty litter box and bag combination in accordance with the present invention.

U.S. Pat. No. 4,541,360 discloses a disposable animal litter box but without any bag of liquid impermeable material in which to enclose the box when ready for disposal. A previous torn away perforated strip is all that is used to cover the used litter, merely replacing it in the opening of the box from which it was originally torn away.

U.S. Pat. No. 4,305,544 discloses a flat sheet of material such as cardboard with score lines, tabs and slots whereby a cat litter box can be assembled for use and eventually discarded.

U.S. Pat. No. 4,271,787 discloses a plurality of litter boxes housed in stacked relationship within a separate box which the purchaser has to assemble. When the litter in the top one of the stacked boxes has been used and ready to dispose of, that one is thrown out and the cover on the box below is torn off to expose the litter therein for use. A separate carrying case is provided for the entire assembly.

U.S. Pat. No. 3,886,901 discloses an originally sealed box having a separate bag of cat litter therein, the sides of the original box being foldable outwardly when the tearstrip is torn away thereby providing the box in which the litter is poured for use by the cats.

U.S. Pat. No. 3,684,155 discloses a book-fold type of receptacle and a flexible sheet liner is placed within this receptacle with portions of the edges of the flexible sheet liner gripped in serrated slots formed in the side walls of the receptacle. When a flexible sheet bag or liner is placed within the litter box, it quickly becomes torn from the cats' scratching.

U.S. Pat. No. 3,227,137 discloses a flexible sheet bag of thermoplastic material such as polyethylene placed within a cat litter box. As pointed out above, such material is readily torn by cats using the box and then scratching the bottom.

The disposable kitty litter box in accordance with the present invention is an improvement over those of the prior art in a number of respects. It provides a box having a peripheral wall which is substantially solid and imperforate around at least the lower half wherein any liquid materials are going to settle. Yet the box is foldable between an open position for use, and a closed position when ready for disposal.

The present invention comprises a disposable kitty litter box made of cardboard, plastic or other disposable material which folds out to provide a tray for holding kitty litter and for use as a kitty litter box by one or more cats, and which folds up into a closed box after it has been fully used with the used kitty litter contents inside for disposal of such contents along with the folded-up box itself.

The foldable box in accordance with this invention comprises an elongated rectangular container when unfolded having a solid bottom wall, a pair of solid end walls except for handle receiving apertures extending upright at each opposite end, and a pair of side walls extending upright along each opposite side which are also solid except for a diagonal slit which extends from about the mid-point of each side wall upwardly at about a forty-five degree angle to terminate at the upper edge of each respective side wall.

Score lines on which to fold and unfold portions of each side wall are provided in relationship to the diagonal slit as follows. A first score line extends axially from the diagonal slit to intersect the bottom edge of each side wall at about a forty-five degree angle. A second score line extends normal to the diagonal slit axially aligned with the first score line. It intersects that inward point of each side wall at which the diagonal slot begins, extending diagonally across each side wall to intersect the upper edge at about a forty-five degree angle and the bottom edge at about a forty-five degree angle. A third score line extends vertically in a direction substantially normal to both the upper edge and bottom edge across each respective side wall from the point where the diagonal slit intersects the upper edge to the point where the second score line intersects the bottom edge. A fourth score line extends vertically in a direction substantially normal to both the upper edge and bottom edge across each respective side wall from the point where the second score line intersects the upper edge to the point where the first score line intersects the bottom edge.

A fifth score line is provided across the bottom wall between the points where the second score line of each side wall intersects the bottom edge and in a direction normal to each side wall. A sixth score line is provided across the bottom wall between the points where the first score line of each side wall intersects the bottom edge and in a direction normal to each side wall.

The portions of each side wall between the third and fourth vertically extending score lines of each side wall are weakened along the first, second, third and fourth score lines to fold inwardly towards the cavity of the box when flexed. The bottom wall is weakened along the fifth and sixth score lines to enable the portions of the box outwardly from each of the fifth and sixth score lines to fold upwardly from such score lines in an arcuate path to bring such two outward portions together for one to be received in the other thereby forming a closed box.

Such folding of the two outward portions in an arcuate path toward each other along the fifth and sixth score lines causes the portions of each side wall between the third and fourth score lines to flex and fold inwardly, to be completely enclosed within the cavity of the box when one of the outward portions of the box is fully received within the other.

The portion of the bottom wall between the fifth and sixth score lines then becomes one of the end walls of the box when folded to its closed position. At such time the end wall of the outward portion which is received in the other outward portion is adjacent to and inward of the end wall of such other outward portion.

The distance the fifth and sixth score lines across the bottom wall are spaced apart corresponds to the upright or vertical dimension of the end walls of the outward portions, so when the box is folded to its closed position that portion of the bottom wall which becomes an end wall of the closed box is substantially the same height, or the same vertical or upright dimension, as the end walls of the outward portions.

The diagonal slits in each wall start inwardly thereof at a point spaced apart from the exact mid-point of each side wall in the direction toward the end wall of the outward portion which is to be received in the other outward portion when folded into the closed box position, and the distance it is spaced apart in such direction from the exact mid-point corresponds to the thickness of the end walls of the outward portions. Such inward starting point of each diagonal slit of each side wall becomes the pivot point on which the outward portions are folded toward each other in an arcuate path. It has to be closer to the end wall of one of the outward portions by the thickness of the end walls to enable one end wall to close inwardly of and adjacent to the other without having to force one into the other by distorting and bending the side and end walls to accomplish that objective. The fifth and sixth score lines are also closer to the end wall of the outward portion which is to be received in the other outward portion by the same distance as the pivot points are spaced apart in such direction from the exact mid-point.

When the box is folded to its closed position with the end walls of both outward portions adjacent each other, in one outside of the other relationship, a movable handle on the inner one can be gripped and drawn through a slot in the end wall of the outer outward portion which thus locks the folded box in its closed position and serves as a carrying handle to carry the closed box and used contents inside to a disposal receptacle.

SUMMARY OF THE INVENTION

It is an object of the invention to provide a disposable kitty litter box which can be unfolded to an open position for use as a litter box by cats and when fully used can be folded to a closed position for disposal of the box itself along with the contents enclosed inside.

It is an object of the invention to provide a disposable kitty litter box foldable between an open and closed position, which has an imperforate lower peripheral wall when in its open position to prevent any seepage through such lower peripheral wall from inside the cavity of the box.

It is an object of the invention to provide a disposable kitty litter box foldable between an open and closed position when assembled, and which is assembled into such foldable box from a single sheet of foldable material such as cardboard.

BRIEF DESCRIPTION OF THE DRAWING

FIG. 1 is a side elevation of a disposable kitty litter box which is foldable between an open and closed position, shown in its open position.

FIG. 2 is a perspective view of a disposable kitty litter box of the type shown in FIG. 1, shown in its open position with one flap of the central flexing portion of each side wall shown partially flexed inwardly of the cavity just prior to folding the box from its open to its closed position.

FIG. 3 is a front end view of the disposable kitty litter box in accordance with this invention, showing the box in its position prior to closing one of its outer portions within the opposite one of its outer portions.

FIG. 4 is a front end view of the disposable kitty litter box of FIG. 3 folded to its fully closed position.

FIG. 5 is a section view taken on line 5-5 of FIG. 3.

FIG. 7 is a side elevation view of one elongated stiffening rib of a pair, one of which is received along the upper edge at the mid-region of each side wall of the foldable box in accordance with this invention when in its open-for-use position, to rigidify the flexing central portions of each side wall while in such open-for-use position.

FIG. 8 is a section view taken on line 8—8 of FIG. 7.

FIG. 9 is a side elevation view of a bag of kitty litter which is secured within the cavity of the kitty litter box in accordance with this invention while in its original closed position, for opening to discharge the kitty litter contents into the cavity of the box when folded to its open position ready for use.

DESCRIPTION OF PREFERRED EMBODIMENT

Figure 6:
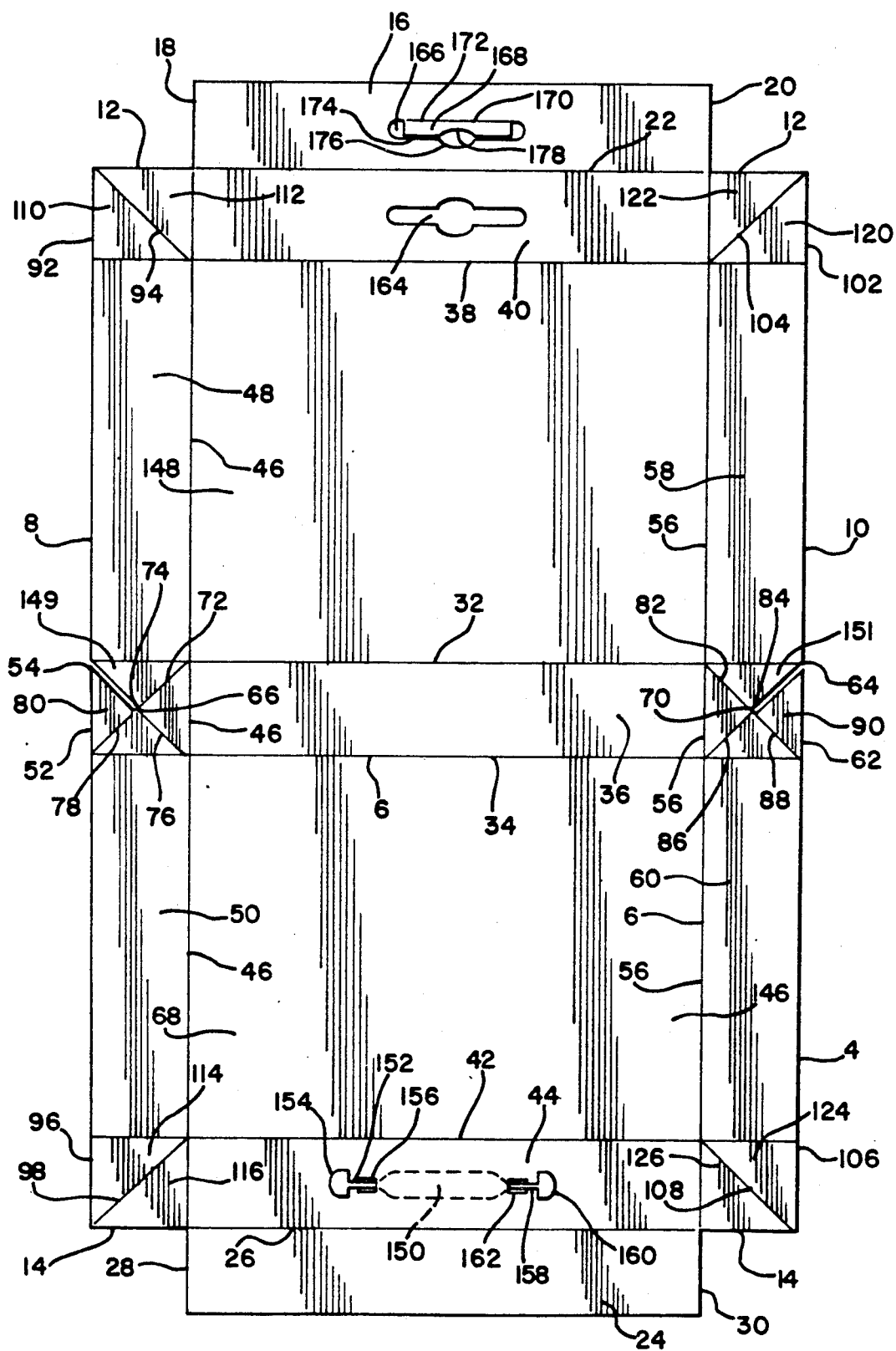
FIG. 6 is a plan view of a single sheet of cardboard from which the disposable kitty litter box in accordance with this invention can be assembled, with the tab portions of the plastic handle visible as received through respective receiving slots in one end region of the sheet.

A disposable kitty litter box 2 in accordance with this invention comprises to begin with a flat sheet 4 of cardboard or other bendable shape retaining material having a plurality of score lines or fold lines 6 along which the material has been weakened to enable folding and flexing the sheet 4 along such fold lines 6, having also a pair of elongated side edges 8 and 10 extending between a pair of opposite end edges 12 and 14.

A first elongated and rectangular flap 16 extends outwardly from end edge 12 terminating at each opposite side in short side edges 18 and 2 each spaced inwardly from respective ones of elongated side edges 8 and 10 an equal distance, such distance being substantially the same dimension as the distance the short side edges 18 and 20 extend outwardly from end edge 12. The rectangular flap 16 is integrally joined to end edge 12 along the fold line 22.

A second elongated and rectangular flap 24 extends outwardly from end edge 14 to which it is integrally joined along fold line 26. Rectangular flap 24 terminates at opposite sides in short edges 28 and 30, each spaced inwardly from respective ones of elongated side edges 8 and 10 an equal distance, such distance being substantially the same dimension as the distance the short side edges 28 and 30 extend outwardly from end edge 14.

A pair of laterally extending spaced apart and parallel fold lines 32 and 34 extend across the flat sheet 4 between side edges 8 and 10 to define therebetween a first rectangular foldable lateral wall 36 parallel to and inwardly from the opposite end edges 12 and 14 of the flat sheet 4 almost an equal distance from each.

Another laterally extending fold line 38 extends across the flat sheet 4 between side edges 8 and 10 parallel to and spaced apart inwardly from the end edge 12 a distance approximately equal to the longitudinal dimension of the short side edges 18 and 20 of the rectangular flap 16 joined to end edge 12 along fold line 22. Such distance is also substantially equal to the distance the lateral fold lines 32 and 34 of the first foldable wall 36 are spaced apart. A second rectangular foldable lateral wall 40 is defined between the end edge 12 and the fold line 38.

Another laterally extending fold line 42 extends across the flat sheet 4 between side edges 8 and 10 parallel to and spaced apart inwardly from the opposite end edge 14 a distance which is approximately equal to the short side edges 28 and 30 of the rectangular flap 24 joined to end edge 14 along fold line 26. Such distance is also substantially equal to the distance the lateral fold lines 32 and 34 of the first foldable wall 36 are spaced apart. A third rectangular foldable lateral wall 44 is defined between the end edge 14 and the fold line 42.

A longitudinally extending fold line 46 extends across the flat sheet 4 between end edges 12 and 14 parallel to and spaced apart inwardly from side edge 8 a distance which is approximately equal to the longitudinal dimensions of the first, second and third lateral foldable walls 36, 40 and 44, defined by the distance fold lines 32 and 34 are spaced apart for the first foldable wall 36, the distance fold line 38 is spaced apart from end edge 12 for the second foldable wall 40, and the distance fold line 42 is spaced apart from end edge 14 for the third foldable wall 44. A first rectangular foldable longitudinal wall 48 is defined between fold line 46, side edge 8, lateral fold line 32 and lateral fold line 38. A second rectangular foldable longitudinal wall 50 is defined between longitudinal fold line 46, side edge 8, lateral fold line 34 and lateral fold line 42.

A first flexing pivot section 52 which is substantially square extends between the first and second foldable longitudinal walls 48 and 50, defined on one side by longitudinal fold line 46, on its opposite outer side by side edge 8, on its side adjacent first foldable longitudinal wall 48 by lateral fold line 32, and on its side adjacent the second foldable longitudinal wall 50 by lateral fold line 34. A diagonal slot 54 is provided in the first flexing pivot section 52 opening at the junction of lateral fold line 32 and side edge 8 extending inwardly thereof at a diagonal and terminating at the central axis or mid-point of the substantially square first pivot section 52.

Another longitudinally extending fold line 56 extends across the flat sheet 4 between end edges 12 and 14 parallel to and spaced apart inwardly from opposite side edge 10 a distance which is approximately equal to the longitudinal dimensions of the first, second and third lateral foldable walls 36, 40 and 44. A third rectangular foldable longitudinal wall 58 is defined between fold line 56, side edge 10, lateral fold line 32 and lateral fold line 38. A fourth rectangular foldable longitudinal wall 60 is defined between fold line 56, side edge 10, lateral fold line 34 and lateral fold line 42.

A second flexing pivot section 62 which is substantially square extends between the third and fourth foldable longitudinal walls 58 and 60, defined on one side by longitudinal fold line 56, on its opposite outer side edge 10, on its side adjacent third foldable longitudinal wall 58 by lateral fold line 32, and on its side adjacent the fourth foldable longitudinal wall 60 by lateral fold line 34. A diagonal slot 64 is provided in the second flexing pivot section 62 opening at the junction of lateral fold line 32 and side edge 10 extending inwardly thereof at a diagonal and terminating at the central axis or mid-point of the substantially square second pivot section 62.

The central axis of the first flexing pivot section 52 provides a first pivot axis 66 on one side when the first and second foldable longitudinal walls 48 and 50 and the first pivot section 52 are folded upwardly along longitudinal fold line 46 to extend substantially perpendicular to the upwardly facing surface 68 of the flat sheet 4.

The central axis of the second flexing pivot section 62 provides a second pivot axis 70 on the opposite side when the third and fourth foldable longitudinal walls 58 and 60 and the second pivot section 62 are folded upwardly along longitudinal fold line 56 to extend substantially perpendicular to the upwardly facing surface 68 of the flat sheet 4.

A diagonal fold line 72 is provided on the first flexing pivot section 52 extending from the junction of lateral fold line 34 and side edge 8 extending inwardly thereacross at a diagonal and terminating at the junction of lateral fold line 32 and longitudinally extending fold line 46, touching the inward termination end 74 of diagonal slot 54 which extends outwardly from the mid-point of diagonal fold line 72 at a right angle thereto. Another diagonal fold line 76 is provided on the first flexing pivot section 52 extending axially from the diagonal slot 54 and at a right angle from the mid-point of diagonal fold line 72 to terminate at the junction of lateral fold line 34 and longitudinal fold line 46.

The diagonal slot 54 and the outer half fold line 78 of diagonal fold line 72 which extends from the termination end 74 of the slot 54 to the junction of lateral fold line 34 and the side edge 8, and that portion of side edge 8 from such junction point to the opening of slot 54 thereto, form the side edges of a triangular foldable flap 80, foldable along the outer half fold line 78 to flex inwardly.

A corresponding diagonal fold line 82 is provided on the second flexing pivot section 62 extending from the junction of lateral fold line 34 and side edge 10 extending inwardly thereacross at a diagonal and terminating at the junction of lateral fold line 32 and longitudinally extending fold line 56, touching the inward termination end 84 of diagonal slot 64 which extends outwardly from the mid-point of diagonal fold line 82 at a right angle thereto. Another diagonal fold line 86 is provided on the second flexing pivot section 62 extending axially from the diagonal slot 64 and at a right angle from the mid-point of diagonal fold line 82 to terminate at the junction of lateral fold line 34 and longitudinal fold line 56.

The diagonal slot 64 and the outer half fold line 88 of diagonal fold line 82 which extends from the termination end 84 of the slot 64 to the junction of lateral fold line 34 and the side edge 10, and that portion of side edge 10 from such junction point to the opening of slot 64 thereto, from the side edges of a triangular foldable flap 90, foldable along the outer half fold line 88 to flex inwardly.

Four corner flexing sections are provided, one at each of the four corners of the rectangular flat sheet 4, including a first corner flexing section 92 which is substantially square bounded on one side by longitudinal fold line 46, on its opposite side by side edge 8, on its side adjacent the first foldable longitudinal wall 48 by lateral fold line 38 and on the side opposite thereto by end edge 12. A diagonal fold line 94 extends across the first corner flexing section 92 from the junction of lateral fold line 38 and longitudinal fold line 46 to terminate at the junction of side edge 8 and end edge 12.

A second corner flexing section 96 is also substantially square, bounded on one side by longitudinal fold line 46, on its opposite side by side edge 8, on its side adjacent the second foldable longitudinal wall 50 by lateral fold line 42 and on the side opposite thereto by end edge 14. A diagonal fold line 98 extends across the second corner flexing section 96 from the junction of lateral fold line 42 and longitudinal fold line 46 to terminate at the junction of side edge 8 and end edge 14.

A third corner flexing section 102 is also substantially square, bounded on one side by longitudinal fold line 56, on its opposite side by side wall 10, on it side adjacent the third foldable longitudinal wall 58 by lateral fold line 38 and on the side opposite thereto by end edge 12. A diagonal fold line 104 extends across the third corner flexing section 102 from the junction of lateral fold line 38 and longitudinal fold line 56 to terminate at the junction of side edge 10 and end edge 12.

A fourth corner flexing section 106 is also substantially square, bounded on one side by longitudinal fold line 56, on its opposite side by side edge 10, on its side adjacent the fourth foldable longitudinal wall 60 by lateral fold line 42 and on the side opposite thereto by end edge 14. A diagonal fold line 108 extends across the fourth corner flexing section 106 from the junction of lateral fold line 42 and longitudinal fold line 56 to terminate at the junction of side edge 10 and end edge 14.

The diagonal fold line 94 of the first corner flexing section 92 divides that section into two right triangle sections 110 and 112, each of substantially equal dimensions. The diagonal fold line 98 of the second corner flexing section 96 divides that section into two right triangle sections 114 and 116, each of substantially equal dimension. The diagonal fold line 104 of the third corner flexing section 102 divides that section into two right triangle section 120 and 122, each substantially equal dimension. The diagonal fold line 108 of the fourth corner flexing section 106 divides that section into two right triangle sections 124 and 126, each of substantially equal dimension.

To assemble the kitty litter box from the flat sheet 4 with its foldable walls, sections and fold lines as described above, the first longitudinal wall 48, second longitudinal wall 50, first corner section 92, second corner section 96 and pivot section 52 are folded on fold line 46 in an upward direction from the upwardly facing surface 68 of the sheet 4 until they are in position substantially normal to such surface 68.

The third longitudinal wall 58, fourth longitudinal wall 60, third corner section 102, fourth corner section 106 and pivot section 62 on the opposite side of the sheet 4 are next folded on fold line 56 in an upward direction from the upwardly facing surface 68 of the sheet 4 until they are in position substantially normal to such surface 68.

The second lateral wall 40 is then folded on fold line 38 in an upward direction from the upwardly facing surface 68 of the sheet 4. As the second lateral wall 40 is folded toward its upright position, the right triangle sections 110 and 112 of first corner section 92 begin to flex inwardly on diagonal fold line 94 and the right triangle section 120 and 122 of the third corner section 102 begin to flex inwardly on diagonal fold line 104. The second lateral wall 40 is folded to an upright position substantially normal to the upwardly facing surface 68 of the sheet 4 at which time it forms a right angle on one side with the first longitudinal wall 48 and on its opposite side with the third longitudinal wall 58. At such time, the right triangle section 112 of the first corner section 92 and the right triangle section 122 of the third corner section 102 are pressed against the inner surface of the now upright second lateral wall 40, with right triangle section 110 of corner section 92 pressed flat against its corresponding right triangle section 112 and right triangle section 120 of corner section 102 pressed flat against its corresponding right triangle section 122.

The flap 16 is then folded on fold line 22 inwardly and downwardly from its integral connection to the second lateral wall 40 until it presses against the right triangle sections 110 and 120 of corner sections 92 and 102 to in turn press their corresponding right triangle sections 112 and 122 respectively against the inner surface of the now upright second lateral wall 40.

The outer edge 18 and 20 of the flap 16 are at such time in frictional engagement with respective ones of the first and third longitudinal walls 48 and 58 which holds the flap 16 firmly in its folded position against the right triangle sections 110 and 120 of the first and third corner sections 92 and 102 and in full facing relationship with the second lateral wall 40.

At the opposite end of the foldable sheet 4, the third lateral wall 44 is then folded on fold line 42 in an upward direction from the upwardly facing surface 68 of the sheet 4. As the third lateral wall 44 is folded toward its upright position, the right triangle sections 114 and 116 of the second corner section 96 begin to flex inwardly on diagonal fold line 98 and the right triangle sections 124 and 126 of the fourth corner section 106 begin to flex inwardly on diagonal fold line 108. The third lateral wall 44 is folded to an upright position substantially normal to the upwardly facing surface 68 of the sheet 4 at which time it forms a right angle on one side with the second longitudinal wall 50 on its opposite side with the fourth longitudinal wall 60. At such time, the right triangle section 116 of the second corner section 96 and the right triangle section 126 of the fourth corner section 106 are pressed against the inner surface of the now upright third lateral wall 44, with right triangle section 114 of corner section 96 pressed flat against its corresponding right triangle section 116 and right triangle section 124 of corner section 106 pressed flat against its corresponding right triangle section 126.

The flap 24 is then folded on fold line 26 inwardly and downwardly from its integral connection to the third lateral wall 44 until it presses against the right triangle sections 114 and 124 of corner sections 96 and 106 to in turn press their corresponding right triangle sections 116 and 126 respectively against the inner surface of the now upright third lateral wall 44.

The outer edges 28 and 30 of the flap 24 are at such time in frictional engagement with respective ones of the second and fourth longitudinal walls 50 and 60 which holds the flap 24 firmly in its folded position against the right triangle sections 114 and 124 of the second and fourth corner sections 96 and 106 and in full facing relationship with the third lateral wall 44.

To reinforce and rigidify the longitudinal side walls and pivot sections, a pair of reinforcing ribs 130 of a rigid plastic material are provided, each having an elongated body portion 132 and an elongated slot 134 open at each opposite end 136 and 138 and along the bottom edge 140. The opening along the bottom edge 140 of the slot 134 corresponds in width to the thickness of the longitudinal side walls 48, 50, 58 and 60 and of the pivot sections 52 and 62, whereby one reinforcing rib 130 receives the upper edge portions of longitudinal side walls 48 and 50 and of pivot section 52 and the other reinforcing rib 130 receives the upper edge portion of longitudinal side walls 58 and 60 and of pivot section 62 on the other side of the assembled kitty litter box. The reinforcing ribs 130 when in place as described, hold the triangular section 80 of pivot section 52 bordering the slot 54 and triangular section 90 of pivot section 62 bordering the slot 64 in alignment with their respective longitudinal side walls and prevent them from flexing inwardly until the reinforcing ribs 130 are removed.

The kitty litter box when assembled as described above is in its open-for-use position. Kitty litter 142 may then be poured from the bag 144 into such open-for-use box. After it has been fully used and is ready for disposal, the kitty litter box may then be folded to its closed position with the used kitty litter contents inside for disposal of the entire kitty litter box assembly together with the contents enclosed therein.

The insert section 146 of the box assembly comprising that part between fold line 34 and flap 24 extending from the third lateral wall 44 is received within the outer section 148 which comprises that part of the box assembly between fold line 32 and flap 16 extending from the second lateral wall 40.

The first lateral wall 36 and pivot sections 52 and 62 are positioned slightly closer to the third lateral wall 44 than to the second lateral wall 40 by a distance which corresponds to the combined thickness of third lateral wall 44 with flap 24 folded over in facing relationship thereto with the folded right triangle sections 114 and 116 of corner section 96 sandwiched therebetween on one side and with the folded right triangle sections 124 and 126 of corner section 106 sandwiched therebetween on the opposite side. Thus, when the outer section 148 is brought into super-imposed position above insert section 146 to receive it therein, when the edge of outer section 148 defined by fold line 32 is in line with the corresponding edge of insert section 146 defined by fold line 34, the opposite edge of outer section 148 comprising lateral wall 40 and fold over flap 16 with the folded right triangle sections of corner sections 92 and 102 sandwiched therebetween extends just beyond the corresponding opposite edge of insert section 146.

To fold the kitty litter box in accordance with this invention from its open-for-use position to its closed-for-disposal position, the reinforcing ribs 130 are first removed to enable the pivot sections 52 and 62 to flex. The outer section 148 is raised to begin pivoting of the first lateral wall 36 on fold line 34 and the outer section 148 on fold line 32. This exerts compressive forces on the pivot sections 52 and 62 causing them to begin to pivot on axes 66 and 70, to flex inwardly along the fold lines 72, 76 and 78 and for triangular section 80 of pivot section 52 bordering slot 54 as well as triangular section 90 of pivot section 62 bordering slot 64 to flex and slide inwardly of their respective adjacent triangular sections 149 and 151 of pivot sections 52 and 62 respectively.

The outer section 148 is pivoted on fold line 32 and the lateral wall 36 is pivoted on fold line 34 until the insert section 146 is received within the outer section 148. At such time the first lateral wall 36 extends upright and normal to the upwardly facing surface 68 of the sheet 4 and it becomes one of the end walls of the closed box. The second lateral wall 40, flap 16 with the folded right angle sections of corner sections 92 and 102 sandwiched therebetween of the insert section 146 lie inwardly of and adjacent to the third lateral wall 44, flap 24 with the folded right angle sections of corner sections 96 and 106 sandwiched between of the outer section 148. The second and third lateral walls 40 and 44 and their fold over flaps 16 and 24 with the folded corner sections sandwiched between the respective lateral walls and their fold over flaps become the opposite end wall of the box when closed. At such time, the longitudinal side walls 48 and 58 of the outer section 148 lie outside of and adjacent to the longitudinal side walls 50 and 60 of the insert section 146.

A laterally extending flexible plastic handle 150 is secured to the third lateral wall 44 by a first tab 152 having an enlarged end 154 inserted through handle slot 156 of the lateral wall 44 and a second tab 158 having an enlarged end 160 inserted through handle slot 162 of the lateral wall 44.

A laterally extending pass-through aperture 164 is provided through the second lateral wall 40 and a similar laterally extending aperture 166 is provided through the fold over flap 16 which faces lateral wall 40 when folded over. These apertures 164 and 166 are positioned to come into registration with the laterally extending handle 150 when the second lateral wall 40 and adjacent flap 16 of the outer section 148 close outside of the third lateral wall 44 of the insert section 146 as the kitty litter box assembly is folded from its open-for-use position to its closed-for-disposal position in the manner described above. The handle 150 may then be grasped through the laterally extending apertures 164 and 166 and pulled through. When the handle 150 secured to the wall 44 of insert section 146 is pulled through the flap aperture 166 and wall aperture 164 of the outer section 148, the handle locks the two sections together in the closed position. It also serves as the carrying handle to carry the closed-for-disposal box and contents to a disposal receptacle or disposal pick-up point for ultimate disposal of both the box and its contents.

The elongated aperture 166 through the flap 16 is provided with a closure member 168 which is foldable on fold line 170 along the outward elongated edge 172 of aperture 166 between an aperture closed position and an aperture open position. The inward edge 174 of elongated aperture 166 includes an arcuate cut-away portion 176 at its mid-region, and the closure member 168 has a corresponding arcuate cut-away portion 178 at its mid-region. When closure member 168 is folded to its aperture closed position, the cut-away portions 176 and 178 are aligned to provide a small opening through which a person can insert his finger to grasp the handle 150 on lateral wall 44 of the insert section 146 after it has been received within the outer section 148, and then pull the handle through aperture 166 of the flap 16 and aligned aperture 164 of lateral wall 40 of the outer section 148. The closure member 168 tends to pull partially through aperture 164 of lateral wall 40 when the handle 150 is pulled through. After the handle is pulled through apertures 164 and 166 to the outside, the closure member 168 is then pushed back into its aperture closed position to cover the aperture 166 of the flap 16.

The foregoing construction provides a container and cavity having a peripheral wall that is completely imperforate around the sides and bottom from the level of the pivot points 66 and 70 at the inner termination points 74 and 84 of the diagonal slots 54 and 64 downward therefrom when the longitudinal side walls and lateral end walls are folded to their upright positions as described.

The longitudinal side walls and lateral end walls should preferably be three to four inches in their upright dimension, and since the inner termination points 74 and 84 of the diagonal slots 54 and 64 terminate midway between the upper and lower edges of the longitudinal side walls and the pivot sections in which they are formed, there is an upright wall portion around the periphery of the box when in its open-for-use position of one and one-half to two inches in depth from the bottom wall up which is completely solid and imperforate so no liquid or other matter can pass therethrough. In a kitty litter box, the liquids settle below the bottom half of the box and in accordance with this invention that portion is completely imperforate in the structure described in detail hereinabove and shown in the drawings.

I claim:

1. A disposable kitty litter assembly, comprising:
a receptacle having a cavity to hold litter therein for use by pets,
including a bottom wall having a first end edge and a second end edge,
upright peripheral wall means integrally joined to said bottom wall throughout its entire periphery and extending upright therefrom, terminating at an upper peripheral edge,
said upright peripheral wall means including
a first longitudinal side portion of said sheet extending perpendicularly from one side of said bottom wall,
a second longitudinal side portion of said sheet extending perpendicularly from the opposite side of said bottom wall,
a first lateral end portion of said sheet extending perpendicularly from said first end edge of said bottom wall, said first lateral end portion having a first frictional locking flap,
a second lateral end portion of said sheet extending perpendicularly from said second end edge of said bottom wall, said second lateral end portion having a second frictional locking flap,
first corner means to foldably connect one end of said first longitudinal side portion of said sheet to one end of said first lateral end portion thereof when in their respective upright positions,
second corner means to foldably connect the opposite end of said first longitudinal side portion of said sheet to one end of said second lateral end portion thereof when in their respective upright positions,
third corner means to foldable connect one end of said second longitudinal side portion of said sheet to the opposite end of said first lateral end portion thereof when in their respective upright positions,
fourth corner means to foldably connect the opposite end of said second longitudinal side portion of said sheet to the opposite end of said second lateral end portion thereof when in their respective upright positions,
said first and third corner means secured between said first lateral end portion and said first frictional locking flap, said frictional locking flap secured by frictionally engaging said first and second longitudinal side portions,
said second and fourth corner means secured between said second lateral end portion and said second frictional locking flap, said frictional locking flap secured by frictionally engaging said first and second longitudinal side portions,
said receptacle having:
a first receptacle portion extending inwardly from said first end edge,
a second receptacle portion extending inwardly from said second end edge,
and pivot means, having a first pivot end disposed on said first longitudinal side portion and extending to a second pivot end disposed on said second longitudinal side portion, said first and second pivot ends each having diagonal slots, said pivot means positioned between said first and second receptacle portions for pivotal movement of said first receptacle portion relative to said second receptacle portion between an open position wherein said cavity of said receptacle is open and a closed position wherein said cavity of said receptacle is closed.

2. A disposable kitty litter assembly as set forth in claim 1, wherein said receptacle is formed from a unitary sheet of disposable material, said unitary sheet including said bottom wall and said first and second end edges thereof, a first longitudinally extending fold line in said sheet between said first longitudinal side portion of said sheet and said bottom wall thereof on which to fold said first longitudinal side portion to an upright position relative to said bottom wall, a second longitudinally extending fold line in said sheet between said second longitudinal side portion of said sheet and said bottom wall thereof on which to fold said second longitudinal side portion to an upright position relative to said bottom wall, a first laterally extending fold line in said sheet between said first lateral end portion of said sheet and said bottom wall thereof along its said first end edge on which to fold said first lateral end portion to an upright position relative to said bottom wall, a second laterally extending fold line in said sheet between said second lateral end portion of said sheet and said bottom wall thereof along its said second end edge on which to fold said second lateral end portion to an upright position relative to said bottom wall.

3. A disposable kitty litter assembly as set forth in claim 2, wherein said first corner means includes a first first-corner fold line in said sheet between said first corner means and said one end of said first longitudinal side portion os said sheet and a second first corner fold line in said sheet between said first corner means and said one end of said first lateral end portion of said sheet to enable said first corner means to flex inwardly of said cavity when said side and end portions are folded to their upright positions, a first second corner fold line in said sheet between said second corner means and said opposite end of said first longitudinal said portion of said sheet and a second second-corner fold line in said sheet between said second corner means and said one end of said second lateral end portion of said sheet to enable said second corner means to flex inwardly of said cavity when said side and end portions are folded to their upright positions, a first third corner fold line in said sheet between said third corner means and said one end of said second longitudinal side portion of said sheet and a second third corner fold line in said sheet between said third corner means and said opposite end of said first lateral end portion of said sheet to enable e said third corner means to flex inwardly of said cavity when said side and end portions are folded to their upright positions, a first fourth corner fold line in said sheet between said fourth corner means and said opposite end of said second longitudinal side portion of said sheet and a second fourth corner fold line in said sheet between said fourth corner means and said opposite end of said second lateral end portion of said sheet to enable said fourth corner means to flex inwardly of said cavity when said side and end portions are folded to their upright positions.

4. A disposable kitty litter assembly as set forth in claim 3, wherein said first corner means includes a third first-corner fold line along which to flex as it flexes inwardly of said cavity, said second corner means includes a third second-corner fold line along which to flex as it flexes inwardly of said cavity, said third corner means includes a third third-corner fold line along which to flex as it flexes inwardly of said cavity, said fourth corner means includes a third fourth-corner fold line along which to flex as it flexes inwardly of said cavity.

5. A disposable kitty litter assembly as set forth in claim 3, including lock means movable between a locking and unlocking position, to hold said first and second longitudinal side portions and said first and second lateral end portions in their said upright positions when said lock means is in its said locking position and to release them from said upright positions when said lock means is in its said unlocking position.

6. A disposable kitty litter assembly as set forth in claim 2, wherein said first pivot end formed in said first longitudinal side portion of said upright peripheral wall means, said second pivot end formed in said second longitudinal side portion of said upright peripheral wall means, said first pivot section includes a first pivot point, said first diagonal slot extending diagonally from said first pivot point in a direction toward said second end edge of said bottom wall and upwardly from said bottom wall, a first-pivot-section flap adjacent said first diagonal slot on a side opposite from said bottom wall to flex inwardly of said cavity of said receptacle when said first and second receptacle portions are pivoted toward their said closed positions, said second pivot section includes a second pivot point, said second diagonal slot extending diagonally from said second-pivot-section point in a direction toward said second end edge of said bottom wall and upwardly from said bottom wall, a second-pivot-section flap adjacent said second diagonal slot on a side opposite from said bottom wall to flex inwardly of said cavity of said receptacle when said first and second receptacle portions are pivoted toward their said closed positions, said first and second pivot points being spaced apart from said first end edge of said bottom wall in the direction toward said second end edge thereof and from said second end edge of said bottom wall in the direction toward said first end edge thereof, said first and second pivot points being located closer to said first end edge than to said second end edge whereby said first receptacle portion when pivoted to said closed position about said pivot point has a shorter longitudinal dimension than said second receptacle portion to enable receipt of said first receptacle portion within said second receptacle portion.

7. A disposable kitty litter assembly as set forth in claim 6, wherein said first pivot end includes a diagonal first-pivot-section fold line extending upwardly at a diagonal from said bottom wall to intersect said first pivot point normal to said diagonal slot and continuing across said first pivot end to terminate at said upper peripheral edge of said upright peripheral wall means, said second pivot end includes a diagonal second-pivot-section fold line extending upwardly at a diagonal from said bottom wall to intersect said second pivot point normal to said diagonally extending second-pivot-section fold line extending upwardly at a diagonal from said bottom wall to intersect said second pivot point normal to said diagonal slot and continuing across said second pivot end to terminate at said upper peripheral edge of said upright peripheral wall means, whereby said first pivot end flexes inwardly of said cavity of said receptacle along said first-pivot-section fold line and said second pivot end flexes inwardly of said cavity of said receptacle along said second-pivot-section fold line when said first and second receptacle portions are pivoted toward their said closed positions.

8. A disposable kitty litter assembly as set forth in claim 7, wherein said pivot means further includes a laterally extending first bottom wall fold line extending across said bottom wall between said first pivot section and said second pivot section terminating on one side at the point where said diagonal first-pivot-section fold line intersects said bottom wall and begins to extend diagonally and upwardly therefrom and terminating on the other side at the point where said diagonal second-pivot-section fold line intersects said bottom wall and begins to extend diagonally and upwardly therefrom, said first bottom wall fold line being closer to said second lateral end portion of said upright peripheral wall means than to said first lateral end portion thereof, said second receptacle portion pivoting on said laterally extending first bottom wall fold line when being pivoted toward said closed position.

9. A disposable kitty litter assembly as set forth in claim 8, wherein said pivot means further includes a laterally extending second bottom wall fold line extending across said bottom wall between said first pivot section and said second pivot section, said second bottom wall fold line being substantially parallel to said first bottom wall fold line and spaced apart therefrom in the direction toward said first lateral end portion of said upright peripheral wall means, said first receptacle portion pivoting on said laterally extending second bottom wall fold line when being pivoted toward said closed position, said second bottom wall fold line being loser to said first lateral end portion whereby said first receptacle portion has a shorter longitudinal dimension that said second receptacle portion and is thereby receivable within said second receptacle portion when pivoted to their said closed position.

10. A disposable kitty litter assembly as set forth in claim 9, wherein the upright dimension of each of said longitudinal side portions and lateral end portions of said upright peripheral wall means between said bottom wall and said upper peripheral edge is substantially the same, the distance the first and second bottom wall fold lines are spaced apart is substantially the same as the said upright dimension of each of the longitudinal side portions and lateral end portions of said upright peripheral wall means, whereby when said first and second receptacle portions are pivoted to their closed position with said first receptacle portion received within said second receptacle portion, that portion of said bottom wall between said laterally extending first and second bottom wall fold lines serves as the end wall of said receptacle when in said closed position opposite the end wall thereof formed by said second lateral end portion and said first lateral end portion in facing relationship to said second lateral end portion and inwardly thereof when said first receptacle portion is received within said second receptacle portion in said closed position.

11. A disposable kitty litter assembly as set forth in claim 10, including a bag containing kitty litter within said cavity of said receptacle, said bag releasably secured to a portion of said receptacle bounding said cavity, wherein when said first and second receptacle portions have been pivoted to their open position said kitty litter is disseminated in said first and second receptacle portions of said cavity.

12. A disposable kitty litter assembly as set forth in claim 7, including a laterally elongated handle on said first lateral end portion of said upright peripheral wall means, a corresponding laterally elongated aperture through said second lateral end portion of said upright peripheral wall means to receive said handle on said first lateral end portion therethrough when said first receptacle portion is received within said second receptacle portion after they have been pivoted to their closed position, said handle on said first lateral end portion when pulled through said aperture of said second lateral end portion serving to lock said first and second receptacle portions in their said closed position.

13. A disposable kitty litter assembly as set forth in claim 7, including a first elongated reinforcing rib having a longitudinal dimension sufficient to span said first pivot section and part of said first longitudinal side portion of said upright peripheral wall means on each side of said first pivot section, said first elongated reinforcing rib having an elongated first-reinforcing-rib slot therein to receive a portion of said upper peripheral edge of said upright peripheral wall means, a second elongated reinforcing rib having a longitudinal dimension sufficient to span said second pivot section and part of said second longitudinal side portion of said upright peripheral wall means on each side of said second pivot section, an elongated second-reinforcing-rib slot therein to receive a portion of said upper peripheral edge of said upright peripheral wall means.

14. A disposable kitty litter assembly as set forth in claim 1, wherein said pivot means is integrally formed with said upright peripheral wall means, said first receptacle portion being receivable within said second receptacle portion when pivoted to said closed position, said pivot means including a pivot point, said pivot point being spaced apart from said first end edge of said bottom wall in the direction toward said second end edge thereof and from said second end edge of said bottom wall in the direction toward said first end edge thereof, said pivot point being located closer to said first end edge than to said second end edge whereby said first receptacle portion when pivoted to said closed position has a shorter longitudinal dimension than said second receptacle portion to enable receipt of said first receptacle portion within said second receptacle portion.

15. A disposable kitty litter assembly as set forth in claim 1, wherein said receptacle includes a handle to carry it when in its said closed position.

16. A disposable kitty litter assembly as set forth in claim 1, including a handle on said first lateral end portion of said upright peripheral wall means, a corresponding end portion aperture through said second lateral end portion of said upright peripheral wall means, a corresponding flap aperture through said second locking flap which is integrally formed with said second lateral end portion, said flap aperture being in registration with said end portion aperture when said second locking flap is folded to its said locking position in facing relationship with said second lateral end portion, said flap aperture and end portion aperture being in registration with said handle on said first lateral end portion when said first receptacle portion is received within said second receptacle portion after they have been pivoted to their closed position, said handle on said first lateral end portion when pulled through said flap aperture of said second locking flap and said end portion aperture of said second lateral end portion serving to lock said first and second receptacle portions in their said closed positions.

17. A disposable kitty litter assembly as set forth in claim 16, wherein said flap aperture of said second locking flap includes a closure member integrally formed with said second locking flap movable between a flap aperture open position and a flap aperture closed position, whereby said closure member may be moved to its said aperture closed position after said handle has been pulled therethrough, said closure member having an area dimension less than that of said flap aperture to provide open space for the portion of said handle which extends from said first lateral end portion through said flap aperture of said second locking flap and through said end portion aperture of said second lateral end portion.

* * * * *